US012618949B2

(12) United States Patent
Galloway et al.

(10) Patent No.: US 12,618,949 B2
(45) Date of Patent: **\*May 5, 2026**

(54) LIDAR SYSTEM INCLUDING MULTIFACETED DEFLECTOR

(71) Applicant: Aurora Operations, Inc., Pittsburgh, PA (US)

(72) Inventors: Ryan Galloway, Bozeman, MT (US); Edward Angus, Bozeman, MT (US); Zeb Barber, Bozeman, MT (US)

(73) Assignee: AURORA OPERATIONS, INC., Pittsburgh, PA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/492,998

(22) Filed: Oct. 24, 2023

(65) Prior Publication Data

US 2024/0061088 A1     Feb. 22, 2024

Related U.S. Application Data

(63) Continuation of application No. 17/558,021, filed on Dec. 21, 2021, now Pat. No. 11,835,657, which is a
(Continued)

(51) Int. Cl.
*G02B 1/06*          (2006.01)
*G01M 11/00*          (2006.01)
(Continued)

(52) U.S. Cl.
CPC .......... *G01S 7/4817* (2013.01); *G01M 11/30* (2013.01); *G02B 1/06* (2013.01); *G02B 5/09* (2013.01);
(Continued)

(58) Field of Classification Search
CPC .......... G02B 1/06; G02B 5/09; G02B 26/121; G02B 7/00; F16C 17/00; G01D 5/35335; G01M 11/30; Y10T 29/49002
(Continued)

(56) References Cited

U.S. PATENT DOCUMENTS 4,005,926 A * 2/1977 Neale ................. G01N 21/8901
                                                    359/834
4,556,278 A   12/1985 Schell
(Continued)

FOREIGN PATENT DOCUMENTS

CN          101551519 A     10/2009
CN          108716894 A     10/2018
(Continued)

OTHER PUBLICATIONS

Canadian Office Action issued in connection with CA Appl. Ser. No. 3125686 dated Jun. 16, 2023.
(Continued)

*Primary Examiner* — Isiaka O Akanbi
(74) *Attorney, Agent, or Firm* — Dority & Manning. P.A.

(57)          ABSTRACT

A system and method for scanning of coherent LIDAR. The system includes a motor, a laser source configured to generate an optical beam, and a deflector. A first facet of the plurality of facets has a facet normal direction. The deflector is coupled to the motor and is configured to rotate about a rotation axis to deflect the optical beam from the laser source. The laser source is configured to direct the optical beam such that the optical beam is incident on the deflector at a first incident angle in a first plane, wherein the first plane includes the rotation axis, wherein the first incident angle is spaced apart from the facet normal direction for the first facet. A second facet of the plurality of facets includes an
(Continued)

optical element configured to deflect the optical beam at the first incident angle into a deflected angle.

20 Claims, 10 Drawing Sheets

Related U.S. Application Data continuation of application No. 16/888,003, filed on May 29, 2020, now Pat. No. 11,237,253, which is a continuation of application No. 16/730,120, filed on Dec. 30, 2019, now Pat. No. 10,754,012.

(60) Provisional application No. 62/788,415, filed on Jan. 4, 2019.

(51) Int. Cl.

| | |
|---|---|
| *G01S 7/481* | (2006.01) |
| *G02B 5/09* | (2006.01) |
| *G02B 26/10* | (2006.01) |
| *G02B 26/12* | (2006.01) |

(52) U.S. Cl.
CPC ......... *G02B 26/106* (2013.01); *G02B 26/121* (2013.01)

(58) Field of Classification Search
USPC .............................. 356/126, 141.4, 146, 639
See application file for complete search history.

(56) References Cited

U.S. PATENT DOCUMENTS

| | | | |
|---|---|---|---|
| 5,157,266 A | 10/1992 | Schmiedl | |
| 5,196,949 A | 3/1993 | Swanberg | |
| 5,260,799 A | 11/1993 | Loce et al. | |
| 5,455,708 A | 10/1995 | Harris et al. | |
| 5,486,694 A | 1/1996 | Harris | |
| 5,546,201 A | 8/1996 | Guerin | |
| 6,366,383 B1 | 4/2002 | Roeder | |
| 9,239,959 B1 | 1/2016 | Evans et al. | |
| 2009/0252537 A1 | 10/2009 | Choi et al. | |
| 2009/0316274 A1 | 12/2009 | Lee et al. | |
| 2013/0241761 A1 | 9/2013 | Cooper et al. | |
| 2015/0153247 A1* | 6/2015 | Cheng ................ | G01D 5/35335 356/73.1 |
| 2017/0082748 A1 | 3/2017 | Nishita | |
| 2017/0254995 A1* | 9/2017 | Bauer ................ | G02B 19/0023 |
| 2017/0299697 A1 | 10/2017 | Swanson | |
| 2018/0306925 A1 | 10/2018 | Hosseini et al. | |
| 2018/0364334 A1 | 12/2018 | Xiang et al. | |

| | | | |
|---|---|---|---|
| 2019/0101671 A1* | 4/2019 | Miner .................. | G02B 26/121 |
| 2019/0310351 A1* | 10/2019 | Hughes ................ | G01S 7/4817 |
| 2022/0043159 A1* | 2/2022 | Angus .................. | G05D 1/0088 |

FOREIGN PATENT DOCUMENTS

| | | |
|---|---|---|
| CN | 108983256 A | 12/2018 |
| JP | 2004109315 A | 4/2004 |
| JP | 2009-251595 A | 10/2009 |
| JP | 2018-132728 A | 8/2018 |
| KR | 2018-0058068 A | 5/2018 |
| KR | 2018-0126927 A | 11/2018 |
| WO | WO-2017/183530 A1 | 10/2017 |
| WO | WO-2018/107237 A1 | 6/2018 |
| WO | WO-2018/217556 A1 | 11/2018 |

OTHER PUBLICATIONS

Corrected Notice of Allowance on U.S. Appl. No. 16/730,120 dated May 29, 2020 (2 pages).
Decision of Refusal on JP Appl. Ser. No. 2021-538997 dated Mar. 29, 2022 (26 pages).
Final Office Action on U.S. Appl. No. 17/558,021 DTD Jun. 15, 2023.
Foreign Action other than Search Report on CA DTD Sep. 22, 2022.
International Preliminary Report on Patentability on Appl. Ser. No. PCT/US2019/069151 dated Jul. 15, 2021 (12 pages).
International Search Report and Written Opinion on Appl. Ser. No. PCT/US2019/069151 dated Apr. 14, 2020 (20 pages).
Niclass, C. et al., "A 0.18Mu M CMOS SoC for a 100-m-Range 10-Frame/s 200x 96-Pixel Time-of-Flight Depth Sensor", IEEE Journal of Solid-State Circuits, vol. 49, No. 1, Jan. 2014, pp. 315-330.
Non-Final Office Action on U.S. Appl. No. 17/558,021 DTD Feb. 2, 2023.
Notice for Reasons of Refusal on JP Appl. Ser. No. 2021-538997 dated Nov. 24, 2021 (17 pages).
Notice of Allowance on U.S. Appl. No. 17/558,021 DTD Aug. 25, 2023.
Notice of Allowance on U.S. Appl. No. 16/730,120 dated Apr. 6, 2020 (14 pages).
Notice of Allowance on U.S. Appl. No. 16/888,003 dated Oct. 8, 2021 (12 pages).
Office Action issued in connection with KR Appl. Ser. No. 10-2021-7023947 dated Feb. 13, 2023 (13 pages).
Office Action on EP Appl. Ser. No. 19845809.3 dated Aug. 11, 2021 (3 pages).
Third Party Submission on U.S. Appl. No. 16/725,375, filed Jun. 25, 2020 (73 pages).
US Office Action on U.S. Appl. No. 16/888,003 dated May 19, 2021 (18 pages).
Office Action issued in connection with Chinese Appl. No. 202210187074.5 dated Feb. 25, 2025.

\* cited by examiner

POLYGON DEFLECTOR 344b

RING GEAR 352

PLANETARY TRANSMISSION GEARS 354

DRIVER SUN GEAR 356

POLYGON DEFLECTOR 344a

DRIVE SHAFT 358

PLANETARY BEARING 359

MOTOR 357

350

LIDAR SYSTEM INCLUDING MULTIFACETED DEFLECTOR

CROSS-REFERENCE TO RELATED APPLICATIONS

This application is a continuation of U.S. patent application Ser. No. 17/558,021, filed Dec. 21, 2021, which is a continuation of U.S. patent application Ser. No. 16/888,003, filed May 29, 2020, which is a continuation of U.S. patent application Ser. No. 16/730,120, filed Dec. 30, 2019, which claims the benefit of and priority to U.S. Provisional Patent Application No. 62/788,415, filed Jan. 4, 2019. The entire disclosures of U.S. patent application Ser. No. 17/558,021, U.S. patent application Ser. No. 16/888,003, U.S. patent application Ser. No. 16/730,120, and U.S. Provisional Patent Application No. 62/788,415 are incorporated herein by reference.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

The present application relates to optical scanning systems, and more specifically to optical scanning systems that use multi-faceted deflectors.

Aspects of the present disclosure relate generally to light detection and ranging (LIDAR) in the field of optics, and more particularly to systems and methods for multifaceted deflector for scanning of coherent LIDAR to support the operation of a vehicle.

One implementation disclosed herein is directed to a system for multifaceted deflector for scanning of coherent LIDAR to support the operation of a vehicle. In some implementations, a LIDAR system includes a motor. In some implementations, the LIDAR system includes an optical source configured to generate an optical beam. In some implementations, the LIDAR system includes a deflector that includes a plurality of facets. In some implementations, a first facet of the plurality of facets has a facet normal direction. In some implementations, the deflector is coupled to the motor and is configured to rotate about a rotation axis to deflect the optical beam from the laser source. In some implementations, the laser source is configured to direct the optical beam such that the optical beam is incident on the deflector at a first incident angle in a first plane. The first plane includes the rotation axis. The first incident angle is spaced apart from the facet normal direction. In some implementations, the system includes a second facet of the plurality of facets that includes an optical element configured to deflect the optical beam at the first incident angle into a deflected angle.

In some implementations, the optical element is a reflective blazed grating with a facet ruling normal direction equal to half the first incident angle for each ruling on the facet. In some implementations, the optical beam is incident on the deflector in the first plane at a different second incident angle in the first plane within 40 degrees of the first incident angle. In some implementations, a second facet of the deflector is covered with a second optical element having a second spacing that is different from the spacing of the optical element of the at least one facet of the deflector. In some implementations, wherein a second facet of the deflector is covered with a second optical element, the second optical element deflects the optical beam at the first incident angle into a second deflected angle that is different than the deflected angle.

In another aspect, the present disclosure is directed to a deflector for scanning of coherent LIDAR to support the operation of a vehicle. In some implementations, the deflector includes a body with a plurality of outward facing facets relative to an axis of the body. In some implementations, a facet of the plurality of outward facing facets has a facet normal direction. In some implementations, the facet of the plurality of outward facing facets is covered with an optical element having a spacing that is less than ten times the operating wavelength that is in a range of 0.8 microns to 10 microns.

Still other aspects, features, and advantages are readily apparent from the following detailed description, simply by illustrating a number of particular implementations and implementations, including the best mode contemplated for carrying out the implementations described in this disclosure. Other implementations are also capable of other and different features and advantages, and their several details can be modified in various obvious respects, all without departing from the spirit and scope of the implementations described in this disclosure. Accordingly, the drawings and description are to be regarded as illustrative in nature, and not as restrictive.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

Figure 1A:
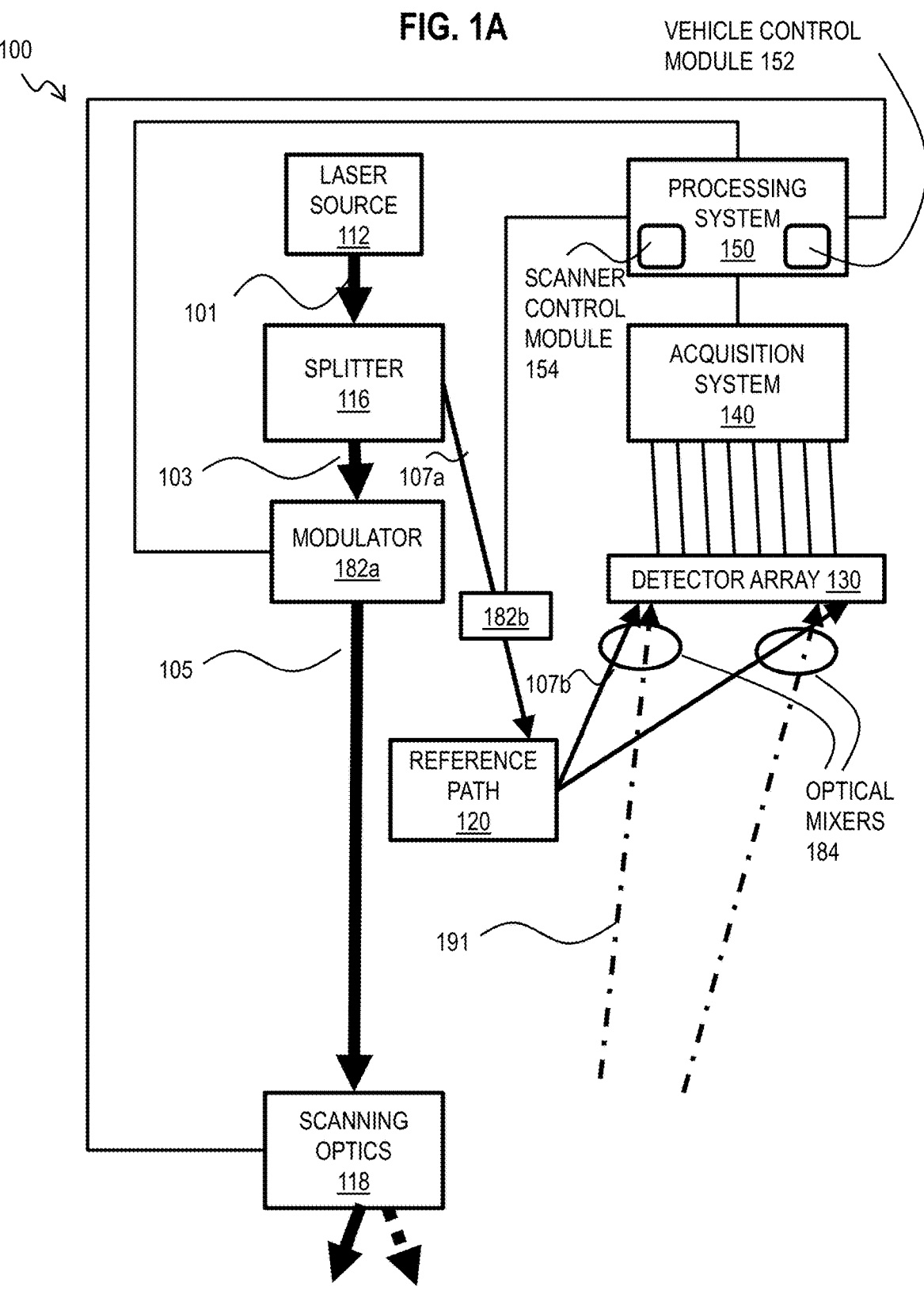
FIG. 1A is a block diagram that illustrates example components of a high resolution (hi res) coherent LIDAR system, according to an implementation.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. Recent advances in LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Recent work shows a novel arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications based on Patent Cooperation Treaty (PCT) patent applications PCT/US2017/062703 and PCT/US2018/016632.

These improvements provide range, with or without target speed, in a pencil thin laser beam of proper frequency or phase content. When such beams are swept over a scene using a scanner (also referred to herein as, "a deflector"), information about the location and speed of surrounding objects can be obtained. This information is expected to be of value in defense and in control systems for autonomous vehicles, such as self-driving, or driver assisted, automobiles.

The sampling and processing that provides range accuracy and target speed accuracy involve integration of one or more laser signals of various durations, in a time interval called integration time. To cover a scene in a timely way for a vehicle control system involves repeating a measurement of sufficient accuracy (involving one or more signals often over one to tens of microseconds) often enough to sample a variety of angles (often on the order of thousands) around an installation or vehicle to understand the environment around the installation or vehicle before an object advances too far into the space ahead of the installation or vehicle (a distance on the order of one to tens of meters, often covered in a particular time on the order of one to a few seconds). The number of different angles that can be covered in the particular time (often called the cycle or sampling time) depends on the sampling rate.

Opto-mechatronic deflection of laser light is conventionally used for beam-steering (scanning) in LIDAR systems. These conventional LIDAR systems on a macro scale involve the selection of reflective, refractive and diffractive elements according to their material properties to guide a spatially coherent light source in a chosen direction. These systems utilize high performance galvanometric scanners that operate under sophisticated second order electromagnetic state-systems necessitating high power data and extensive tuning.

However, the reflective surface of conventional scanners often produce irregular scanning patterns that complicate the detection or identification of objects in the vicinity of the scanning system, especially a scanning system on a surface vehicle.

Accordingly, the present disclosure is directed to systems and methods for multifaceted deflector for scanning of coherent LIDAR, to support the operation of a vehicle. That is, the present disclosure describes systems and methods of LIDAR beam scanning where near horizontal inclination/declination angles (vertically above and below, respectively, a level direction at zero inclination) can be achieved with wider horizontal coverages by replacing the reflective surfaces of the scanner with gratings, thereby improving a LIDAR system's capability to detect and identify objects within its vicinity.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

1. Range Detection Overview

Using an optical phase-encoded signal for measurement of range, the transmitted signal is in phase with a carrier (phase=0) for part of the transmitted signal and then changes by one or more phases changes represented by the symbol $\Delta\phi$ (so phase=$\Delta\phi$) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one phase value and a 1 for the other phase value, thus the symbol is one bit, and the baud rate is also called the bit rate. In multiphase encoding, there are multiple phase values. For example, 4 phase values such as $\Delta\phi*\{0, 1, 2$ and $3\}$, which, for $\Delta\phi=\pi/2$ (90 degrees), equals $\{0, \pi/2, \pi$ and $3\pi/2\}$, respectively; and, thus 4 phase values can represent 0, 1, 2, 3, respectively. In this example, each symbol is two bits and the bit rate is twice the baud rate.

For optical ranging applications, the carrier frequency is an optical frequency fc and a RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus, a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise.

In chirped detection, the laser power is on for a limited pulse duration, $\tau$, starting at time 0. The frequency of the pulse increases from $f_1$ to $f_2$ over the duration r of the pulse, and thus has a bandwidth $B=f_2-f_1$. The frequency rate of change is $(f_2-f_1)/\tau$.

The returned signal is just the transmitted reference signal diminished in intensity and delayed by $\Delta t$. When the returned signal is received from an external object after covering a distance of 2R, where R is the range to the target, the returned signal start at the delayed time $\Delta t$ is given by 2R/c, where c is the speed of light in the medium (approximately $3\times10^8$ meters per second, m/s). Over this time, the frequency has changed by an amount that depends on the range, called $f_R$, and given by the frequency rate of change multiplied by the delay time. This is given by Equation 1a.

$$f_R=(f_2-f_1)/\tau**2R/c=2BR/c\tau \qquad (1a)$$

The value of $f_R$ is measured by the frequency difference between the transmitted signal and returned signal in a time domain mixing operation referred to as de-chirping. So the range R is given by Equation 1b.

$$R=f_Rc\tau/2B \qquad (1b)$$

Of course, if the returned signal arrives after the pulse is completely transmitted, that is, if 2R/c is greater than $\tau$, then Equations 1a and 1b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 1b. While the absolute range may be off due to uncertainty of the speed of light in the medium, this is a near-constant error and the relative ranges based on the frequency difference are still very precise.

2. Optical Detection Hardware Overview

In order to depict the new scanning techniques, some generic hardware approaches are described. FIG. 1A is a block diagram that illustrates example components of a high-resolution (hi-res) coherent LIDAR system 100, according to an implementation. Optical signals are indicated by arrows. Electronic wired or wireless connections are indicated by segmented lines without arrowheads. A laser source 112 emits a carrier wave or beam 101 that is phase or frequency modulated in modulator 182a, before or after splitter 116, to produce a phase coded or chirped optical signal 103 that has a duration D. A splitter 116 splits the modulated (or, as shown, the unmodulated) optical signal for use in a reference path 120. A target beam 105, also called a transmitted signal herein, with most of the energy of the beam 101 is produced. A modulated or unmodulated reference beam 107a with a much smaller amount of energy that is nonetheless enough to produce good mixing with the returned beam 191 scattered from an object (not shown) is also produced. In the illustrated implementation, the reference beam 107a is separately modulated in modulator 182b. The reference beam 107a passes through reference path 120 and is directed to one or more detectors as reference beam 107b. In some implementations, the reference path 120 introduces a known delay sufficient for reference beam 107b to arrive at the detector array 130 with the scattered light from an object outside the LIDAR within a spread of ranges of interest. In some implementations, the reference beam 107b is called the local oscillator (LO) signal referring to older approaches that produced the reference beam 107b locally from a separate oscillator or optical source.

The transmitted signal is then transmitted to illuminate an area of interest, often through some scanning optics 118. The detector array is a single paired or unpaired detector or a 1 dimensional (1D) or 2 dimensional (2D) array of paired or unpaired detectors arranged in a plane roughly perpendicular to returned beams 191 from the object. The reference beam 107b and returned beam 191 are combined in zero or more optical mixers 184 to produce an optical signal of characteristics to be properly detected. The frequency, phase or amplitude of the interference pattern, or some combination, is recorded by acquisition system 140 for each detector at multiple times during the signal duration D. The number of temporal samples processed per signal duration or integration time affects the down-range extent.

The number or integration time is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 150, such as a computer system, or a chip set. A scanner control module 154 provides scanning signals to drive the scanning optics 118, according to one or more of the implementations described below. In some implementations, a signed Doppler compensation module (not shown) in processing system 150 determines the sign and size of the Doppler shift and the corrected range based thereon along with any other corrections, if any. The processing system 150 also includes a modulation signal module (not shown) to send one or more electrical signals that drive the modulators 182a, 182b. In some implementations, the processing system also includes a vehicle control module 152 to control a vehicle on which the system 100 is installed.

Any known apparatus or system may be used to implement the laser source 112, modulators 182a, 182b, beam splitter 116, reference path 120, optical mixers 184, detector array 130, scanning optics 118, or acquisition system 140. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

Figure 1B:
FIG. 1B is a block diagram that illustrates an example system that includes at least one hi-res LIDAR system mounted on a vehicle, according to an implementation.
Figure 1B:
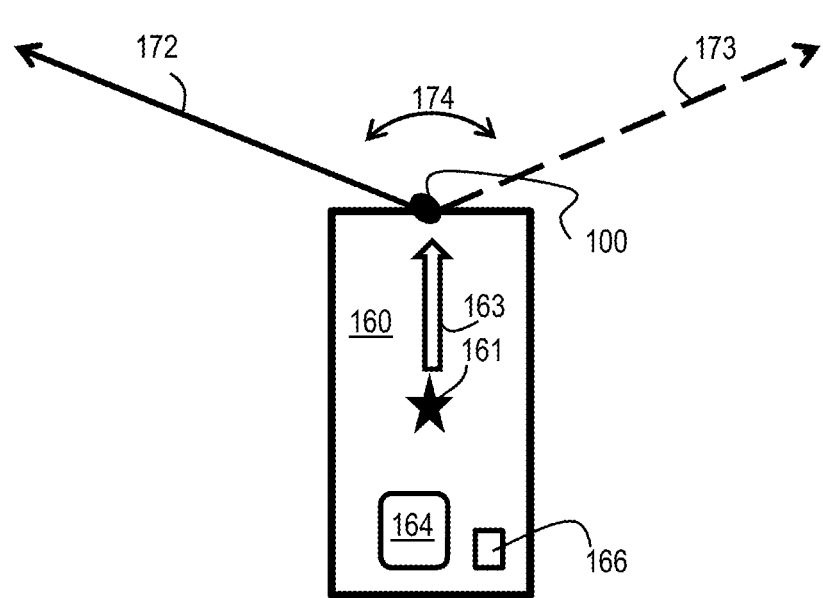

In some implementations a vehicle is controlled at least in part based on data received from a hi-res Doppler LIDAR system mounted on the vehicle. FIG. 1B is a block diagram that illustrates an example system 102 that includes at least one hi-res LIDAR system 100 mounted on a vehicle 160, according to an implementation. The vehicle has a center of mass indicated by a star 161 and travels in a forward direction given by arrow 163. In some implementations, the vehicle 160 includes a component, such as a steering or braking system (not shown), operated in response to a signal from a processor, such as the vehicle control module 152 of the processing system 150. In some implementations the vehicle has an on-board processor 164, such as chip set. In some implementations, the on-board processor 164 is in wired or wireless communication with a remote processor. In an implementation, the processing system 150 of the LIDAR system is communicatively coupled with the on-board processor 164 or the processing system 150 of the LIDAR is used to perform the operations of the on-board processor 164 so that the vehicle control module 152 causes the processing system 150 to transmit one or more signals to the steering or braking system of the vehicle to control the direction and speed of the vehicle.

The hi-res Doppler LIDAR uses a scanning beam 172 that sweeps from one side to another side, represented by future beam 173, through an azimuthal field of view 174, as well as through vertical angles (see for example FIG. 2A) illuminating spots in the surroundings of vehicle 160. In some implementations, the field of view is 360 degrees of azimuth. In some implementations the inclination angle field of view is from about +10 degrees to about −10 degrees or a subset thereof.

In some implementations, the vehicle includes ancillary sensors (not shown), such as a GPS sensor, odometer, tachometer, temperature sensor, vacuum sensor, electrical voltage or current sensors, among others well known in the art. In some implementations, a gyroscope 166 is included to provide rotation information.

3. Polygonal Scanning Overview

Figure 2A:
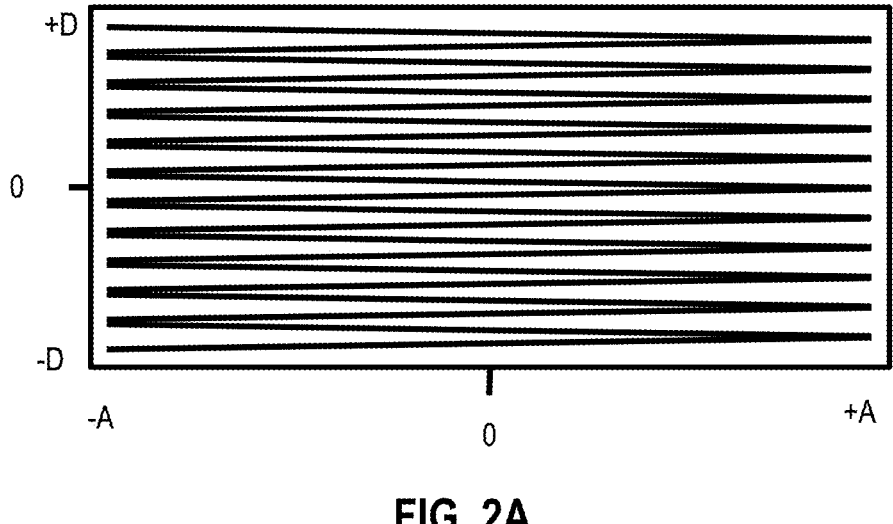
FIG. 2A is a block diagram that illustrates a saw tooth scan pattern for a hi-res Doppler system, used in some implementations.
Figure 2B:
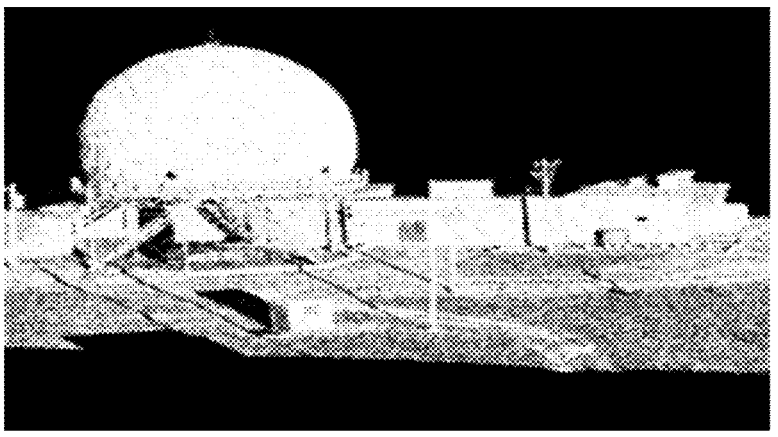
FIG. 2B is an image that illustrates an example speed point cloud produced by a hi-res Doppler LIDAR system, according to an implementation.

FIG. 2A is a block diagram that illustrates a simple saw tooth scan pattern for a LIDAR system, used in some prior art implementations. The scan sweeps through a range of azimuth angles (horizontally) and inclination/declination angles (vertically above and below, respectively, a level direction at zero inclination). In various implementations described below, other scan patterns are used. Any scan pattern known in the art may be used in various implementations. For example, in some implementations, adaptive scanning is performed using methods described in PCT patent applications by Crouch entitled "Method and system for adaptive scanning with optical ranging systems," or entitled "Method and system for automatic real-time adaptive scanning with optical ranging systems," the entire contents of each of which are hereby incorporated by reference as if fully set forth herein. FIG. 2B is an image that illustrates an example speed point cloud produced by a hi-res Doppler LIDAR system, according to an implementation.

Figure 3A:
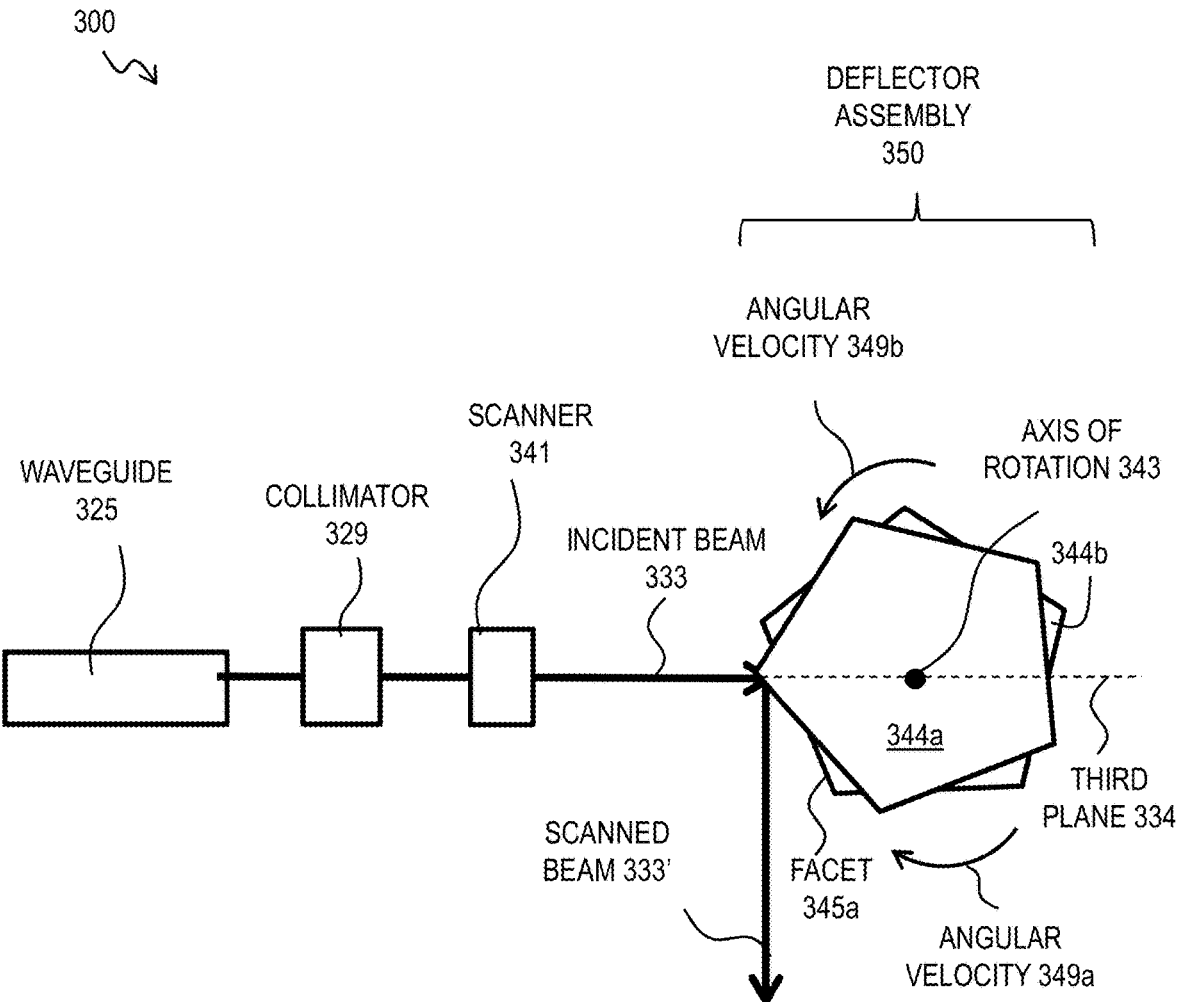
FIG. 3A is a block diagram that illustrates a top view of example components of scanning optics, according to an implementation.

FIG. 3A is a block diagram that illustrates a top view of example components of scanning optics 300, according to an implementation. The scanning optics 300 is an implementation of scanning optics 118 of system 100, with the features discussed herein. The scanning optics 300 includes a deflector assembly 350 made up of a first polygon deflector 344a coupled to a motor 357 (not shown) and configured to rotate at a first angular velocity 349a about a rotation axis 343. In the illustrated implementation, the deflector assembly 350 also includes a second polygon deflector 344b coupled to the motor 357 and configured to rotate at a second angular velocity 349b about the rotation axis 343. Although two polygon deflectors 344a, 344b are depicted in scanner optics 300, fewer or more than two polygon deflectors are included in the scanning optics 118 in other implementations. In the illustrated implementation, the first angular velocity 349a has a first fixed rotation speed and the second angular velocity 349b has a second fixed rotation speed that is different (e.g., less than or opposite to) the first fixed rotation speed. For example, the first fixed rotation speed of the first angular velocity 349a is in a range from about 1000 revolutions per minute (rpm) to about 5000 rpm and the second fixed rotation speed of the second angular velocity 349b is in a range from about 300 rpm to about 1000 rpm. As another example, the first angular velocity 349a and the second angular velocity 349b have different directions (e.g. clockwise and counter-clockwise). Although a five-sided regular polygon (pentagon) deflector is depicted for both polygon deflectors, in other implementations, other regular or irregular polygon deflectors are used. In some implementations, a single beam is directed alternately on multiple polygonal deflectors; and, in other implementations, multiple different beams are directed on different sets of one or more polygonal deflectors each. In some implementations, the polygon deflectors have reflective facets and are called polygon reflectors.

In one implementation in which the reflectors rotate in opposite directions, a ratio of the mass of the second polygon deflector 344b to the mass of the first polygon deflector 344a is about equal to the ratio of the rotation speed of the first angular velocity 349a to the rotation speed of the second angular velocity 349b. This advantageously ensures there is no net angular momentum for an assembly implementing the polygon deflectors 344a, 344b during rotation, which achieves stability of the scanner optics 300 during operation when a vehicle on which they are disposed steers into a turn or otherwise rotates.

Figure 3B:
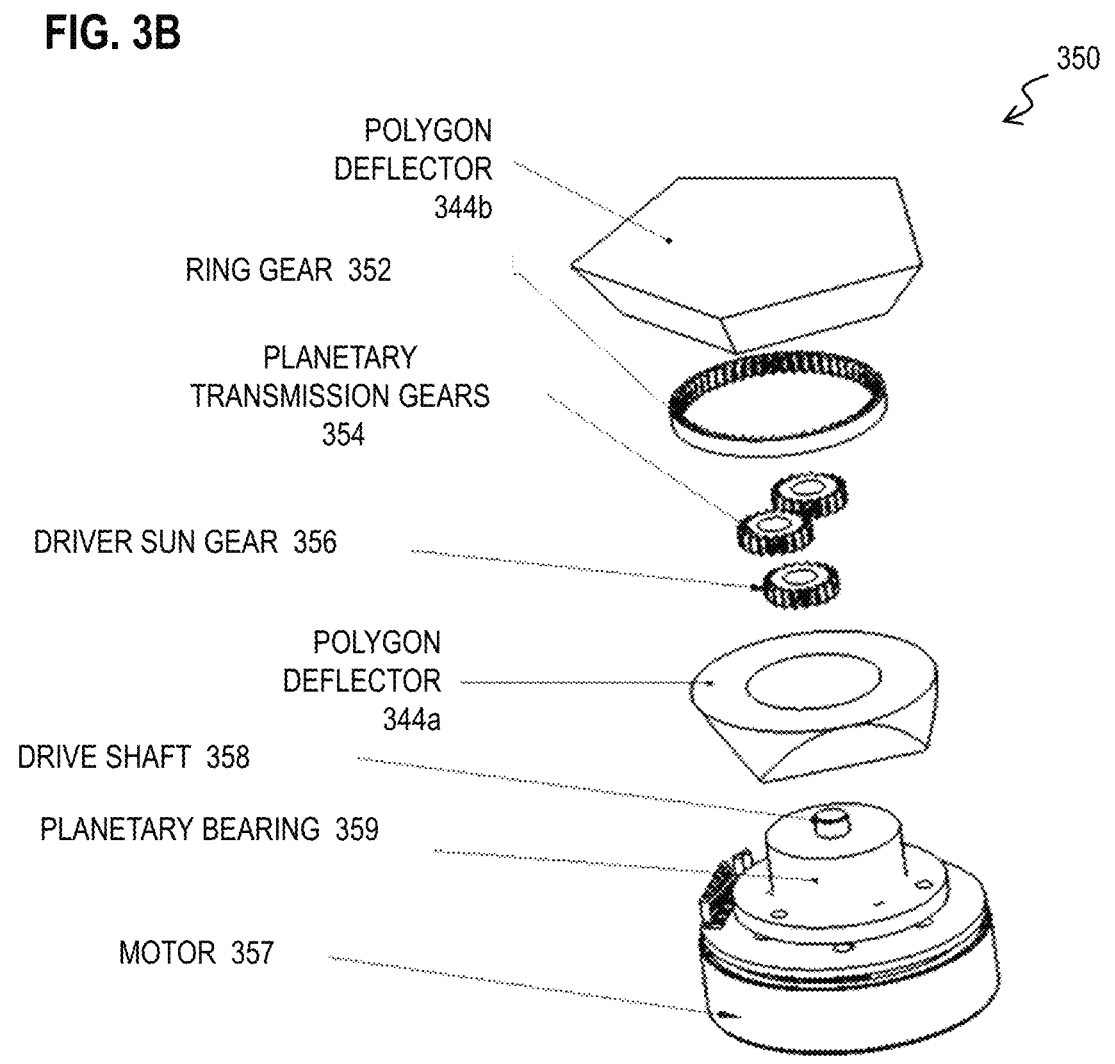
FIG. 3B is a schematic diagram that illustrates an exploded view of a deflector assembly, according to an implementation.

FIG. 3B is a schematic diagram that illustrates an exploded view of deflector assembly 350, according to an implementation. In the illustrated implementation, the deflector assembly 350 includes the first polygon deflector 344a that is operatively coupled to the motor 357 and the second polygon deflector 344b that is operatively coupled to the motor 357 through the first polygon deflector 344a. The first polygon deflector 344a is rotatably mounted to a drive shaft 358 and planetary bearing 359 of the motor 357. The first polygon deflector 344a includes a recess (not shown) to receive the drive shaft 358 and planetary bearing 359. The second polygon deflector 344b is rotatably mounted to the first polygon deflector 344a with planetary transmission gears 354 and a driver sun gear 356 that are positioned within a ring gear 352. The ring gear 352 is received within a cavity (not shown) on an undersurface of the second polygon deflector 344b. One or more parameters of the planetary transmission gears 354, driver sun gear 356, and/or ring gear 352 (e.g. diameter, quantity, etc.) are selected to adjust a ratio of a magnitude of the rotation speed of the first angular velocity 349a of the first polygon deflector 344a to a magnitude of the rotation speed of the second angular velocity 349b of the second polygon deflector 344b. In various implementations, the ratio is in a range from about 3 to about 10 or in a range from about 3 to about 30. Any suitable motor known in the art may be used as the motor 357, such as one manufactured by Nidec Copal® Electronics, Inc. of Torrance, California. Any suitable gears may be used for one or more or the ring gear 352, planetary transmission gears 354, or driver sun gear 346, such as available from SDP/SI® gears including S1EO5ZMO5S072 internal ring gear coupled with selections from ground metric spur gear offerings.

When a beam impinges on a face of the deflector, the beam is deflected at a deflection angle relative to the incident beam, e.g., at an angle of specular reflection for a reflective surface on the face of the deflector. It is common practice for reflective faces of the deflector to be in a plane perpendicular to a radial from the rotation axis 343 of the deflector assembly 350, and such an arrangement is assumed in the following for the purposes of illustrating the problems with current use of reflective surfaces. However, similar problems arise if the faces are not so oriented. It is further assumed for purposes of illustration that the axis of rotation is pointing in the local vertical from which declination angles are measured; and that the plane perpendicular to the axis of rotation is horizontal in which azimuthal angles lie. However, the same problems and principles apply no matter what direction the axis of rotation points.

Horizontal scanning is often accomplished with a beam from source/detector optics impinging in the horizontal plane toward a point inside the deflector, and often inside a circle inscribed in the polygonal deflector, such as the intersection of the axis of rotation with the horizontal plane. If the beam were directed outside this inscribed circle, then there would be some rotation angles of the deflector that do not intersect a face of the deflector and thus there would be angles not deflected at all. In some arrangements, such gaps in any deflection might be desirable. If the beam is directed toward the axis of rotation (as depicted in FIG. 3A), then at some angle of rotation, the reflective face of the deflector would be perpendicular to the impinging beam and reflect the beam back toward the source, which would interfere with the beam leaving the device to scan the vicinity outside the device.

Figure 4A:
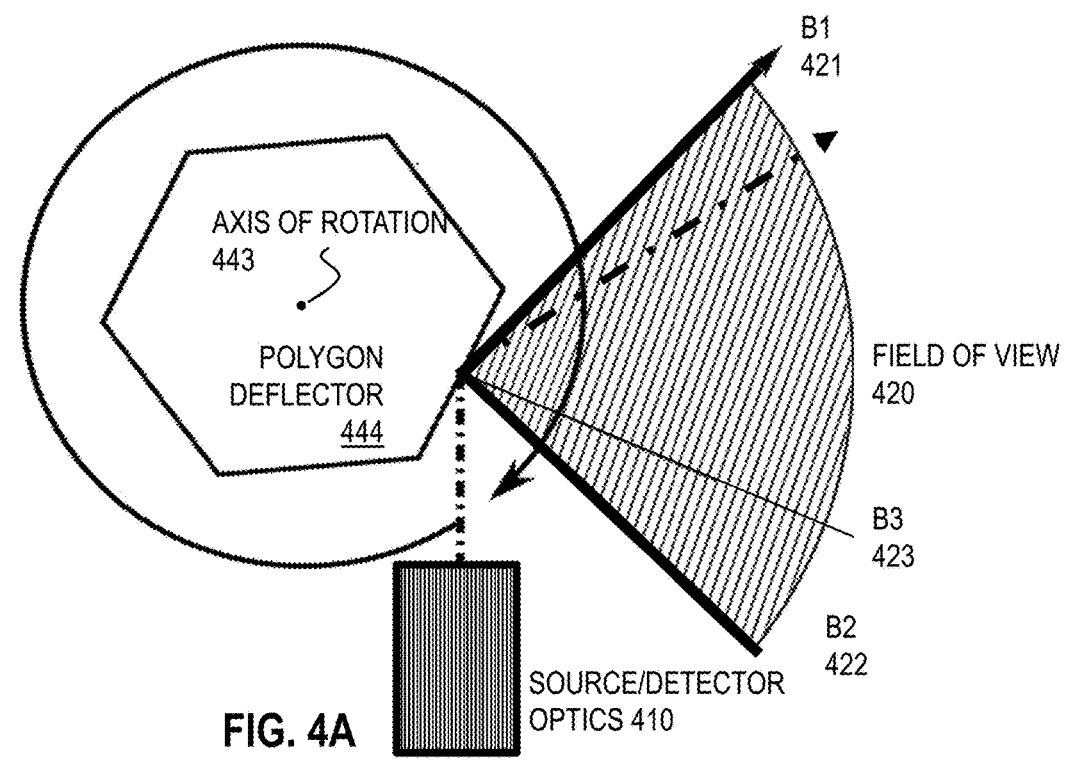
FIG. 4A is a block diagram that illustrates an example scanning system with an off-axis impinging beam in a plane perpendicular to the axis of rotation.

FIG. 4A is a block diagram that illustrates example scanning with an off-axis impinging beam in a (horizontal) plane perpendicular to the axis of rotation. A beam from source/detector optics 410 impinges on a face of polygon deflector 444 rotating around axis of rotation 443. Both the face of the polygon deflector 444 and the axis of rotation are perpendicular to the plane of the drawing. In this configuration, the beam is not directed to the axis of rotation and no beam is reflected back to the source/detector optics 410. An azimuth reflected angle varies in a field of view 420 between angle B1 421 when the optical beam first impinges on the face, to an angle B2 422 when the face rotates out of the optical beam. This azimuthal field of view 420 is not symmetric about the azimuthal angle B3 423 perpendicular to the face of the deflector. The field of view 420 is smaller than if the beam from the source/detector optics 410 were directed toward the axis of rotation 443; but, prevents the reflected beam from being blocked by the source/detector optics 410. The field of view 420 increases with increasing size of the polygon deflector 444. The increased size of the polygon deflector can be disadvantageous for a scanning system on vehicles with space or weight limitations.

Figure 4B:
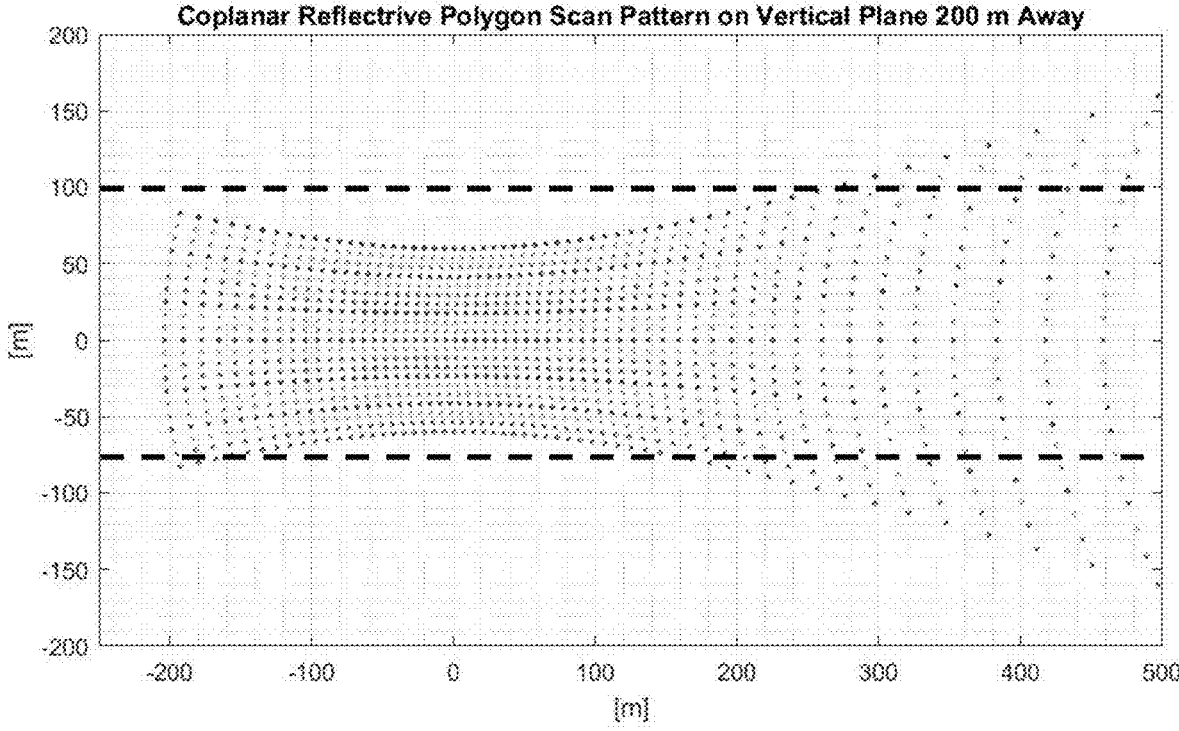
FIG. 4B depicts the arrangement of scanned spots using an impinging beam in or near the (horizontal) plane perpendicular to the axis of rotation.

FIG. 4B depicts the arrangement of scanned spots on a target plane perpendicular to a plane that includes the axis of rotation using an impinging off-axis beam in or near the (horizontal) plane perpendicular to the axis of rotation, as depicted in FIG. 4A. The target plane is 200 meters from the axis of rotation. The horizontal axis indicates the distance in the horizontal plane in meters; and the vertical axis indicates the distance in the vertical plane in meters, both relative to a beam at position (0, 0) in the horizontal plane and reflected to be perpendicular to the current face of the polygon deflector 444. The off horizontal spots are produced by stepping the source/detector optics 410 in vertical angle on the order of a degree, $O(1°)$ to a maximum of +/−10 degrees. Note that the illuminated spots are not symmetric about the reflection perpendicular from the face of the deflector; but, are more symmetrical vertically. A relatively useful rectangular array of spots is found from about −75 meters to about +100 meters vertically and from about −200 meters to about +500 meters horizontally. This relatively regular array simplifies the detection or identification of objects in the vicinity of the scanning system. Furthermore, the spot array with a few tens of meters vertical spread near horizontal is useful especially for land and sea surface vehicles, where the surface is in the near horizontal, (small declination) angles and there is little advantage to steep declination or inclination angles.

Figure 5A:
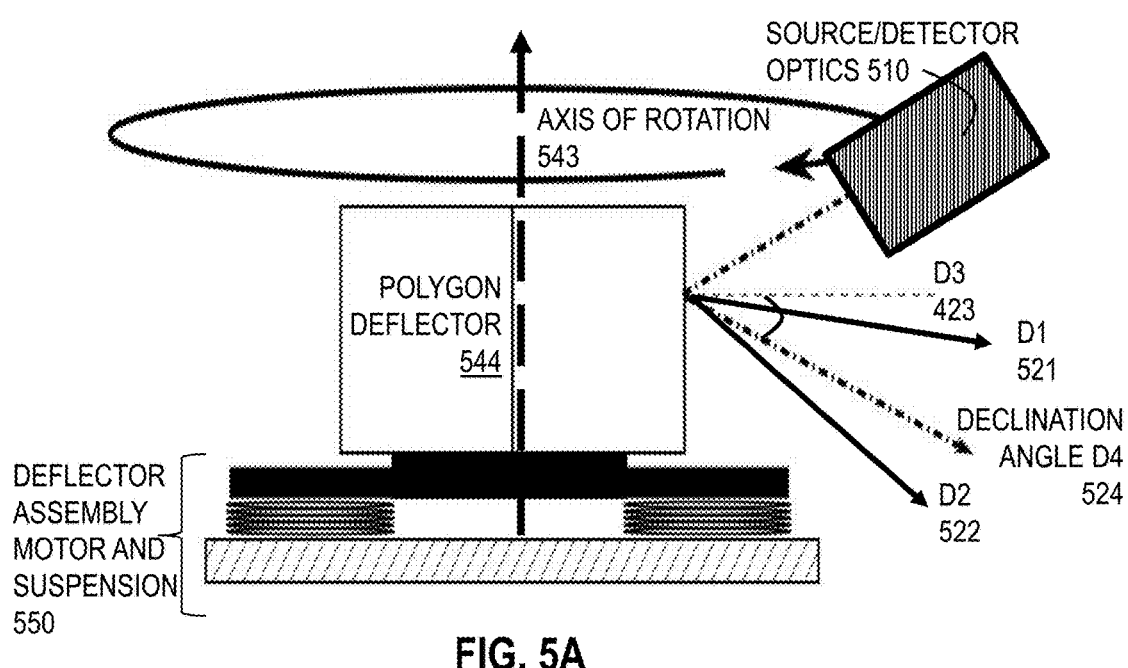
FIG. 5A is a block diagram that illustrates an example scanning system with an on-axis impinging beam in a plane that includes the axis of rotation.

In order to use the wider azimuthal field of view available for an on-axis angle of impingement of beam on a face of the polygon deflector, without blocking by the source/detector optics, a non-horizontal impinging beam has been used, as depicted in FIG. 5A. FIG. 5A is a block diagram that illustrates example scanning with an on-axis impinging beam in a plane that includes the axis of rotation. A beam from source/detector optics 510 impinges on a face (perpendicular to the plane of the drawing) of polygon deflector 544 rotating around axis of rotation 543 in the plane of the diagram. The rotation is imparted by motor and suspension components 550 of a deflector assembly. In this configuration, no beam is reflected back to the source/detector optics 510 that is above the horizontal plane (the horizontal plane is at declination angled D3 423 equal to zero). As a result, a non-zero declination angle D4 is imposed on the reflected beam. As the declination angle of the source/detector optics 510 varies from declination angle D1 to angle D2 522, a declination field of view 520 is covered. As the polygon rotates, an azimuth reflected angle varies in a field of view (not shown) between angle A (when beam first impinges on the face) to an angle −A (when the face rotates out of the beam). This azimuthal field of view is symmetric about the azimuthal angle perpendicular to the face of the deflector. Because the azimuthal approach angle of the impinging beam is toward the axis of rotation 543, a much larger azimuthal field of view is obtained than the field of view 420 depicted in FIG. 4A. Thus, a smaller polygon deflector can be used to achieve the same horizontal extant at a given range. The use of a smaller polygon is advantageous for a scanning system on vehicles with space or weight limitations.

Figure 5B:
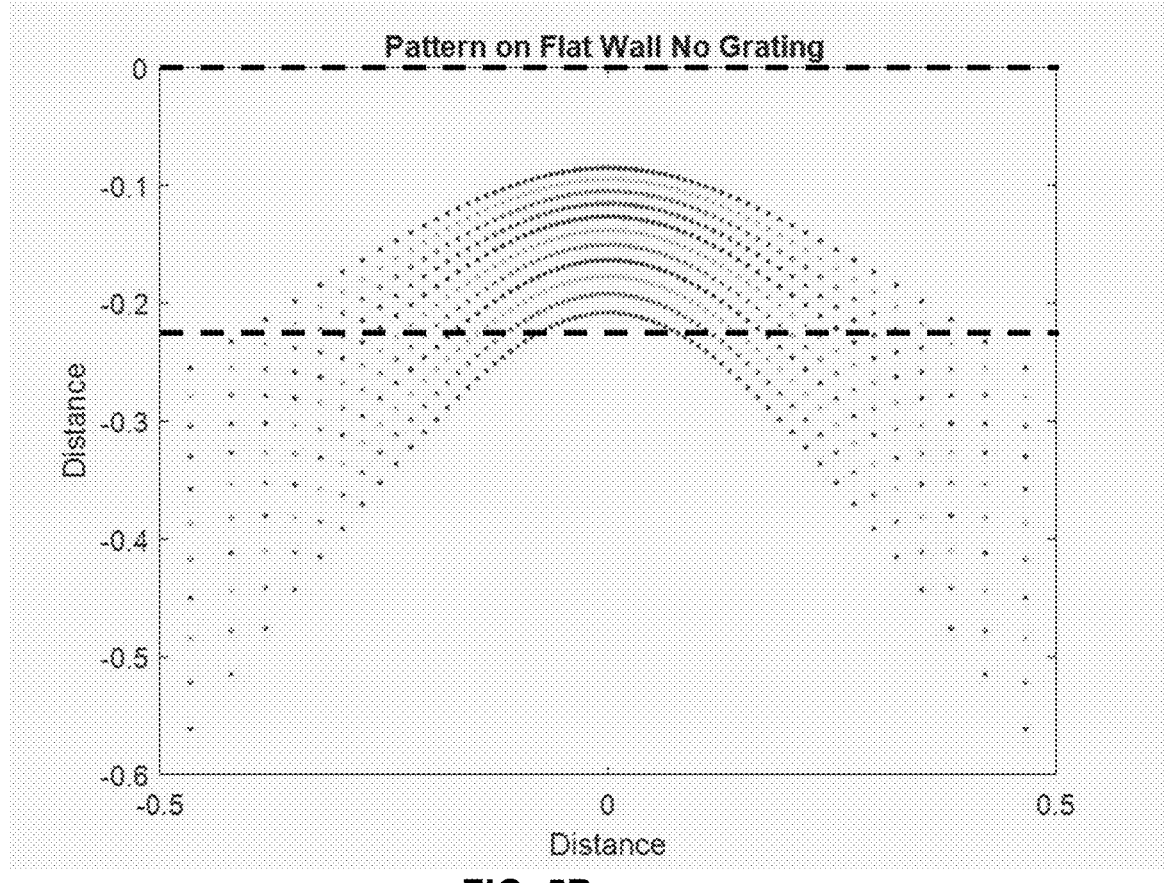
FIG. 5B depicts the arrangement of scanned spots using an impinging beam off the (horizontal) plane perpendicular to the axis of rotation.

A disadvantage of the non-zero declination angle is that the vertical displacement increases more quickly with increasing distance to a target plane, than occurs with the horizontal impingement of FIG. 4A. FIG. 5B depicts the arrangement of scanned spots using an impinging beam off the (horizontal) plane perpendicular to the axis of rotation. The target plane is a distance R from the axis of rotation. The horizontal axis indicates the distance in the horizontal plane in units of kilometers (km, 1 km=$10^3$ meters); and the vertical axis indicates the distance in the vertical plane in units of km, both relative to a beam at position 0,0 in the horizontal plane and reflected perpendicular to the current face of the polygon deflector 544. The spots on different vertical rows spots are produced by stepping the source/detector optics 510 in vertical angle between D1 521 and D2 522. Note that, in contrast to FIG. 4B, the illuminated spots are now symmetric about the reflection perpendicular from the face of the deflector and much wider azimuthally; but, are much less symmetrical vertically. As described above, for surface vehicles a relatively useful rectangular area of interest is at small declination angles, e.g., for distances on the order of 0 to negative 0.1R. In contrast, the pattern of illuminated spots in FIG. 5B goes far outside the useful region for azimuthal angles to the left and right of the field of view. What has been gained in azimuthal range has been lost from useful near horizontal spots at the outer edges of the field of view. This relatively irregular array complicates the detection or identification of objects in the vicinity of the scanning system, especially a scanning system on a surface vehicle.

4. Polygonal Grating

In various implementations, it is recognized that the advantages of near horizontal inclination/declination angles shown in the pattern of FIG. 4B can be achieved with wider horizontal coverages shown in the pattern of FIG. 5B, by replacing the reflective surfaces of the polygon deflector 544 with gratings. In some implementations, horizontal or near horizontal inclination/declination angles may be within +10 degrees to −10 degrees of the facet normal direction. In some implementations, horizontal or near horizontal inclination/declination angles may be within +5 degrees to −5 degrees of the facet normal direction.

Figures 6A, 6B:
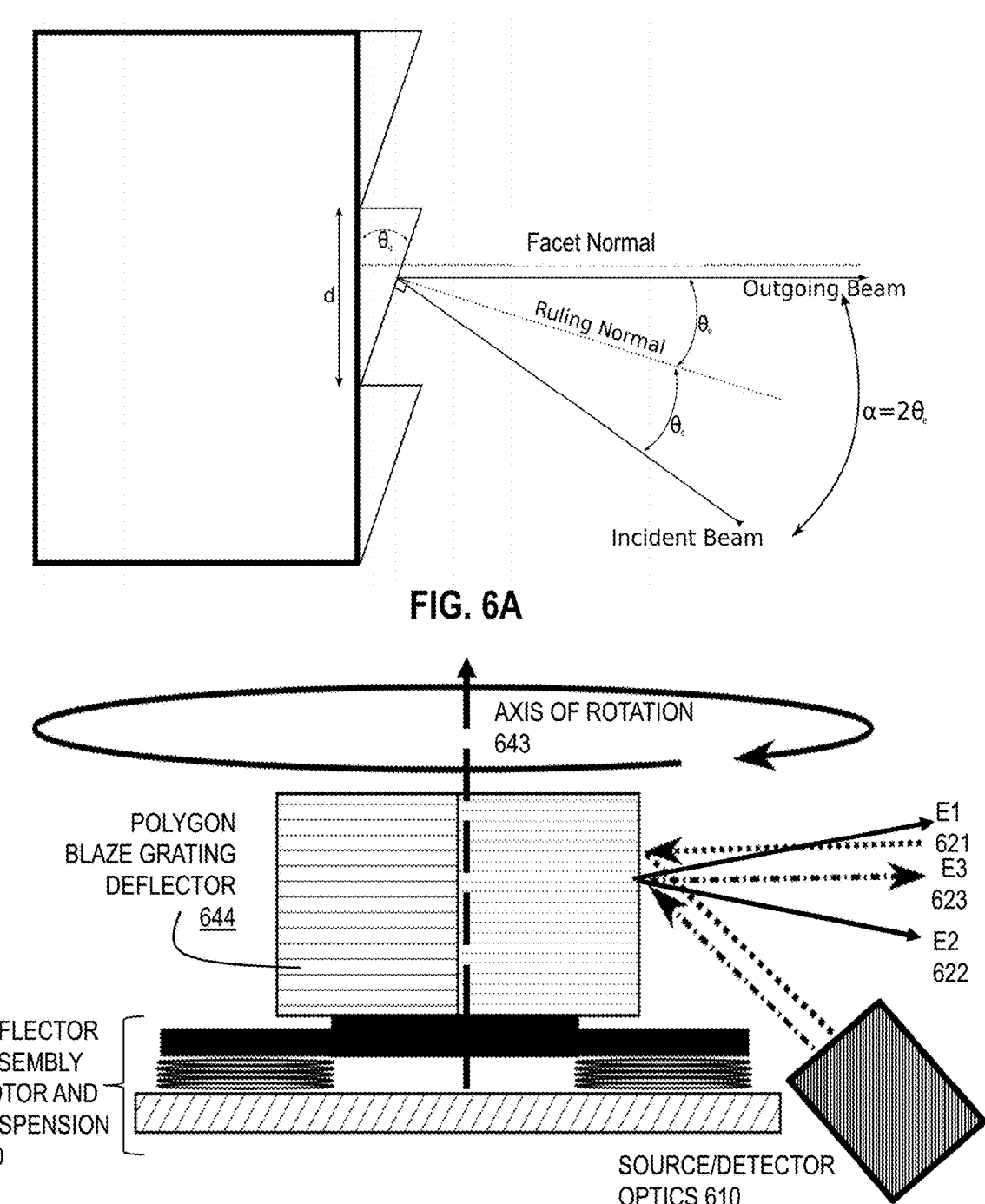
FIG. 6A is a block diagram that illustrates a blazed grating, used as a facet of a polygon deflector, according to an implementation.
FIG. 6B is a block diagram that illustrates an example scanning system using a polygon deflector with a blazed grating facet and an on-axis impinging beam in a plane that includes the axis of rotation, according to an implementation.

FIG. 6A is a block diagram that illustrates a blazed grating, used as a face (or facet) of a polygon deflector, according to an implementation. Like every optical grating, a blazed grating has a constant line spacing d that determines the magnitude of the wavelength splitting caused by the grating. In a blazed grating, the grating lines, called the ruling lines hereinafter, possess a triangular, sawtooth-shaped cross-section, forming a step structure. The steps are tilted at the so-called blaze angle $\theta_B$ with respect to the polygon face, called the facet hereinafter. Accordingly, the angle between a facet normal and ruling normal is $\theta_B$. The blaze angle is optimized to maximize efficiency for the wavelength of the used light and often includes a reflective surface for the surface at the blaze angle. Descriptively, this means $\theta_B$ is chosen such that the beam diffracted by the ruling lines and the beam reflected at the steps are both deflected into the same direction. At angles close to the blaze angle a large fraction of the incident energy is still deflected at high efficiency. In a Littrow configuration, the incident angle and deflected angle are equal. In a non-Littrow configuration for blazed gratings used in some implementations herein, the incident angle is not at the facet normal but the deflected beam is, so the blaze angle is selected to be at or near half the incident angle, or half an incident angle within a range of incident angles. This allows source/detector optics at the incident angle to be out of the way of the deflected beam at all azimuthal angles, and thus allows for a wider azimuthal field of view with a smaller polygon deflector, all while still having a near horizontal deflected beam to avoid the large vertical excursions of little interest for many applications, such as surface vehicles.

FIG. 6B is a block diagram that illustrates an example scanning system using a polygon deflector with a blazed grating facet and an on-axis impinging beam in a plane that includes the axis of rotation, according to an implementation. A beam from source/detector optics 610 impinges on a face (perpendicular to the plane of the drawing) of polygon deflector 644 rotating around axis of rotation 643 in the plane of the diagram. The rotation is imparted by motor and suspension components 550 of a deflector assembly. In this configuration, no beam is deflected back to the source/detector optics 610 that is below the horizontal plane (the horizontal plane has a declination angled E3 623 equal to zero). However, the source/detector optics 610 causes a beam to impinge on the facet at or near twice the Blaze angle below the horizontal, so that all deflected beams are at or near horizontal at angle E3 623. The deflected beam E3 623 is horizontal when the impinging beam is incident at $\alpha=2\theta_B$, as indicated by the dot-dashed arrow. The returned beam from an object follows the same angles in reverse direction, as indicated by the dotted arrow. As the incident angle of the source/detector optics 510 varies from somewhat less than, to somewhat greater than, twice the blaze angle, the deflected beam has an inclination/declination that varies from angle E1 621 slightly above horizontal (positive inclination angle) to angle E2 622 slightly below horizontal (a negative inclination angle or a positive declination angle). Thus, a near horizontal inclination/declination field of view 620 is covered. As the polygon rotates, an azimuth reflected angle varies in a field of view (not shown) between angle A when beam first impinges on the facet, to an angle −A when the facet rotates out of the beam. This azimuthal field of view is symmetric about the azimuthal angle perpendicular to the face of the deflector.

Because the azimuthal approach angle of the impinging beam is toward the axis of rotation 643, a much larger azimuthal field of view is obtained than the field of view 420 depicted in FIG. 4A. Thus, a smaller polygon deflector can be used to achieve the same horizontal extant at a given range. The use of a smaller polygon is advantageous for a scanning system on vehicles with space or weight limitations. Because the deflected angles are near horizontal, there is not the distortion in vertical extent in a target plane, as depicted in FIG. 5B.

Figure 6C:
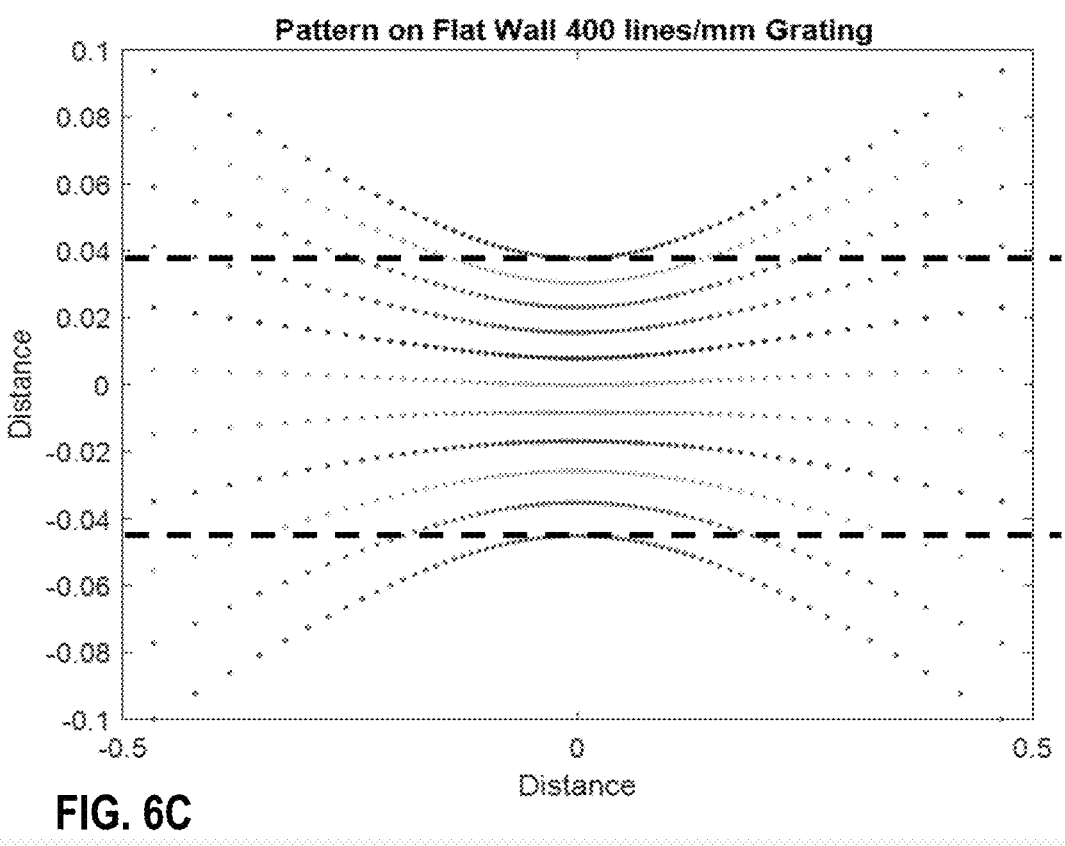
FIG. 6C depicts the arrangement of scanned spots using the blazed grating polygon deflector and an impinging beam at or near twice the blaze angle, according to an implementation.
Figure 6D:
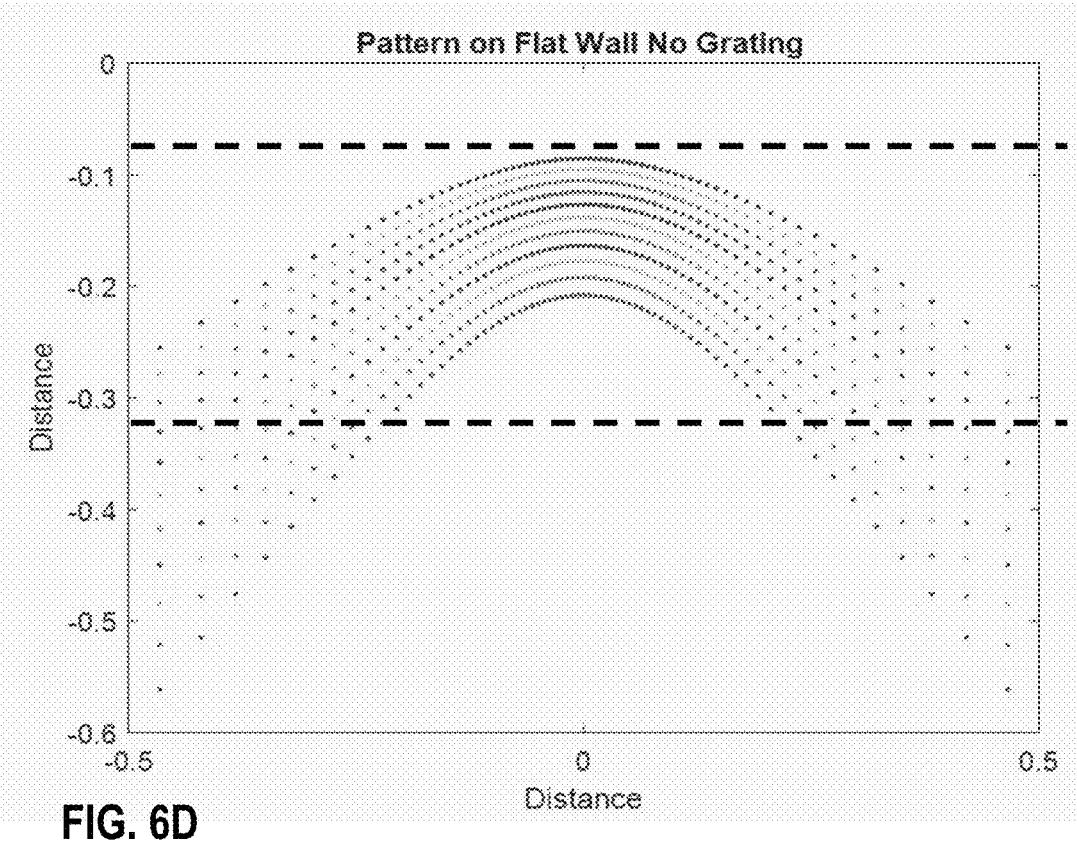
FIG. 6D is a repeat of FIG. 5B for easy comparison with FIG. 6C.

FIG. 6C depicts the arrangement of scanned spots using the blazed grating polygon deflector and an impinging beam at or near twice the blaze angle, according to an implementation. The target plane is a distance R from the axis of rotation. The horizontal axis indicates the distance in the horizontal plane in units of km; and the vertical axis indicates the distance in the vertical plane that includes the axis of rotation in units of km, both relative to a beam at position (0, 0) in the horizontal plane and reflected perpendicular to the current face of the polygon deflector 544. The spots on different vertically separated rows are produced by stepping the source/detector optics 610 in vertical angle near twice the blaze angle. Note that, in contrast to FIG. 4B, the illuminated spots are now symmetric about the reflection perpendicular from the face of the deflector and much wider azimuthally. Note that in contrast to FIG. 5B, repeated as FIG. 6D, the vertical distribution is much more symmetrical vertically. As described above, for surface vehicles a relatively useful rectangular area of interest is at small inclination and declination angles, e.g., for distances on the order of 0 to +/−0.1R. In contrast, the pattern of illuminated spots in FIG. 6D goes far outside the useful region for azimuthal angles to the left and right of the field of view. What had been lost from useful near horizontal spots at the outer edges of the field of view has been recovered by the use of a polygon deflector with a face comprising a blaze grating. This less irregular array simplifies the detection or identification of objects in the vicinity of the scanning system, especially a scanning system on a surface vehicle. The physics of diffraction is described in Equation 2

$$\sin \alpha + \sin \beta = m\lambda/d \qquad (2a)$$

Where d is the ruling spacing, $\alpha$ is the incident angle, $\beta$ is the deflected angle, both relative to the facet normal, $\lambda$ is the optical wavelength and m is the mode number, with most of the energy going into mode m=1. In various implementations, the deflected beam is designed to be normal to the facet and different from the incident beam, so $\beta=0$; and thus the incident angle $\alpha$ is given by Equation 2b.

$$\alpha = (\arcsin(m\lambda/d)) \qquad (2b)$$

By choosing line spacing d, order m, and incident angle, $\alpha$, for a given optical wavelength used in the coherent LIDAR, an outgoing beam can be normal to the polygon surface and behave like a horizontal plane polygon deflector.

To maximize the efficiency of light into the m=1 order, an appropriate blazed grating can be used. The blaze wavelength is generally defined for the Littrow configuration that is when the incident and deflected angle are equal. However, the grating configuration shown in FIG. 6A, is not at the Littrow angle; and so, the appropriate blaze wavelength is different than the standard Littrow blaze wavelength. In FIG. 6A, the deflected beam is designed to be normal to the facet, $\beta=0$, and so the blaze angle is selected to be half the incident angle to maximize efficiency in the deflected first order. So the blaze angle is given by Equation 3.

$$\theta_B = (\arcsin(m\lambda/d))/2 \qquad (3)$$

Thus in some implementations, it is advantageous for the incident angle, $\alpha$, the grating ruling spacing d, and the blaze angle $\theta_B$, be jointly chosen and optimized for the LIDAR operation wavelength for high diffraction efficiency, which effects both the outgoing and incoming beam.

There are at least two practical options for how to scan the vertical axis with a diffractive polygon. The first is using a galvo (e.g., a set of motor driven mirrors that steer a laser beam through a lens) where the vertical scan direction is stationary for a facet, then is stepped a small amount as the beam is "broken" by the transition between the facets and is again stationary over the next facet. The second option is to use different ruling spacing, d, on the diffraction grating for each facet. This leads to different diffracted beam angles for each facet, effectively doing a horizontal sweep for one facet, then the next facet another horizontal sweep but at a different vertical angle. So, a comparable amount of vertical scan range should be achievable for a diffractive polygon.

In some implementations, the impinging beam consists of multiple beams a small vertical angle apart, e.g., 4 beams at ~0.57° angle spacing between them. So, if the polygon is a four-sided object, where each group of beams has an angular spread of 2.28° (including an extra space), then with different blaze angles on each facet, a total of ~10° vertical field of view could be achieved, where each of the lines is spaced by 0.57°. If the angle between beams were to increase, or the number of facets increase, then the vertical field of view would increase.

In an example implementation, the wavelength is about 1550 nanometers (nm, 1 nm=$10^{-9}$ meters). For a mode 1 diffraction and a grating with pitch (1/d) of 600 lines per mm (e.g., d=1.666 microns, 1 micron=1 micrometer, $\mu$m, =$10^{-6}$ meters), an incident angle of about 68 degrees to avoid the source/detector optics achieves a deflected beam normal to the facet. The blaze angle is half that at about 34 degrees. In contrast, the blaze wavelength for the Littrow configuration and the same spacing is about 1874 nm.

Figure 7:
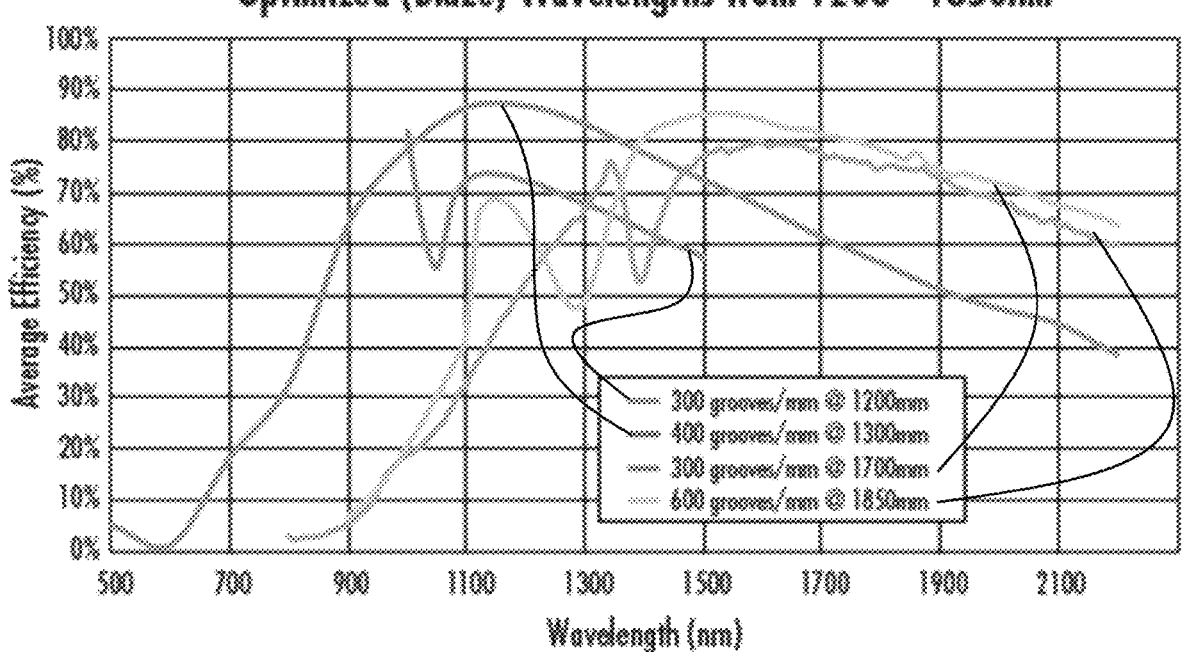
FIG. 7 is a plot of efficiency versus wavelength of blazed gratings for multiple candidate wavelengths.

It is advantageous if most of the diffracted energy goes into the first mode so that the signal to noise is as large as possible in the returned beam. For a properly tuned system, the optical energy going into the first mode can be as high as 90% efficiency for high precision gratings. FIG. 7 is a plot of efficiency versus wavelength of blazed gratings for multiple candidate wavelengths in the Littrow configuration. While not directly applicable, it demonstrates suitability of a blazed grating to efficiently put energy into the horizontally deflected beams from a non-horizontal incident angle that permits avoidance of the source/detector optics. This plot shows how much of the light is transmitted into the first diffraction order (m=1) for various grating pitches (reciprocal of ruling spacings d) optimized for different wavelengths of light from 1200 nm to 1850 nm for the Littrow configuration. At 1200 nm, a grating ruling of 300 lines per millimeter (mm, 1 mm=$10^{-3}$ meters) provides an efficiency of about 74% in Littrow. At 1300 nm, a grating ruling of 400 lines per millimeter provides an efficiency of about 88% in Littrow. At 1700 nm, a grating ruling of 300 lines per millimeter provides an efficiency of about 82% in Littrow. At 1850 nm, a blaze grating ruling of 600 lines per millimeter provides an efficiency of about 76% in Littrow. Such performance is adequate for many example implementations.

Thus, in a first set of implementations, an optical scanning system includes a motor 357, an optical source (e.g., source/detector optics 610) for an optical beam, and a polygon deflector 644 (also referred to herein as, "multi-faceted deflector"). Each facet of the multi-faceted deflector has a facet normal direction. The multi-faceted deflector is operatively coupled to the motor and configured to rotate at an angular velocity about a rotation axis to deflect the optical beam from the source. The source is configured so that the optical beam is incident on the multi-faceted deflector in a first plane that includes the rotation axis at an incident angle in the first plane spaced apart from the facet normal direction for each facet. At least one facet is covered with a grating having a facet ruling spacing selected to deflect the optical beam at the first incident angle into a deflected angle within ten degrees of the facet normal direction.

In some implementations of the first set, the grating is a reflective blazed grating with a facet ruling normal direction equal to half the first incident angle for each ruling on the facet. In some implementations of the first set, the optical beam is incident on the multi-faceted deflector in the first plane at a different second incident angle in the first plane within 40 degrees of the first incident angle. In some implementations of the first set, a first facet of the multi-faceted deflector has a different grating spacing from a different second facet of the multi-faceted blazed grating, whereby the optical beam incident at the first incident angle is deflected into a first deflected angle by the first facet and is deflected into a different second deflected angle by the second facet. In some implementations of the first set, the source of the optical beam is a source of multiple optical beams and the multiple optical beams approach the axis of rotation at multiple different incident angles.

In a second set of implementations, a multi-faceted deflector for an optical scanning system includes a body with a plurality of outward facing facets relative to a central axis of the body. Each facet of the multi-faceted deflector has a facet normal direction and is covered with a reflective blazed grating having a facet ruling spacing in a range from 0.8 micron to 10 microns. Ruling spacings d for high efficiency generally are greater than 50% of the operating wavelength $\lambda$. Yet to achieve sufficient diffraction angle, the spacings are advantageously less than 10× the operating wavelength. Thus, grating ruling spacing d in a range from 0.5λ to 10λ are advantageous, Even more advantageous are grating ruling spacing din a range from 2λ to 5λ.

In some implementations, each facet also has a facet ruling normal direction at a blaze angle to the facet normal direction for each ruling on the facet in a range from 10 degrees to 40 degrees, so that the maximized incident angle allows for the optical source/receiver to not be impinged or otherwise interfere with the outgoing scanning deflected beam. A cross-section of the multi-faceted deflector in a plane perpendicular to the central axis has a maximum diameter in a range from 0.5 centimeters to 10 centimeters. To take advantage of the smaller polygons useful when grating facets are employed, diameters close to 5 cm (2 inches) are used. Thus, in some implementations, the cross-section has a maximum diameter in a range from 4 centimeters to 6 centimeters or 0.5 centimeters to 5 centimeters.

In various implementations, one or more facets each has a normal direction perpendicular to the central axis; while in some implementations, one or more facets each has a canted face with a normal direction that is not perpendicular to the central axis. In various implementations, a cross-section of the multi-faceted deflector perpendicular to the central axis has a regular or irregular polygonal shape. In various implementations, two or more multi-faceted deflectors each with at least one grating facet moving in concert or at different rates and even opposite directions are combined in a deflector assembly as part of LIDAR scanning optics 118.

5. Alterations, Extensions and Modifications

In the foregoing specification, the present disclosure has been described with reference to specific implementations thereof. It will, however, be evident that various modifications and changes may be made thereto without departing from the broader spirit and scope of the present disclosure. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some implementations of the present disclosure are described below in the context of a single front mounted hi-res Doppler LIDAR system on a personal automobile; but, implementations are not limited to this context. In other implementations, one or multiple systems of the same type or other high resolution LIDAR, with or without Doppler components, with overlapping or non-overlapping fields of view or one or more such systems mounted on smaller or larger land, sea or air vehicles, piloted or autonomous, are employed. In other implementations, the scanning hi-res LIDAR is mounted at temporary or permanent fixed positions on land or sea.

What is claimed is:

1. A light detection and ranging (LIDAR) sensor system for a vehicle, comprising:
    a laser source configured to output a first beam; and
    an irregular polygon scanner configured to receive the first beam and output the first beam as a second beam, wherein the irregular polygon scanner comprises a multi-faceted deflector having a cross-section with an irregular polygonal shape.

2. The LIDAR sensor system of claim 1, wherein the multi-faceted deflector comprises a plurality of facets that are each reflective.

3. The LIDAR sensor system of claim 1, wherein the multi-faceted deflector comprises a plurality of facets that each have a diffraction grating.

4. The LIDAR sensor system of claim 1, wherein the multi-faceted deflector is a first first multi-faceted deflector configured to rotate about a rotation axis, and wherein the LIDAR sensor system comprises a second deflector configured to rotate about the rotation axis.

5. The LIDAR sensor system of claim 1, further comprising a modulator configured to apply at least one of frequency modulation or phase modulation to the first beam.

6. The LIDAR sensor system of claim 1, wherein a diameter of the multi-faceted deflector is greater than or equal to about 0.5 centimeters and less than or equal to about 10 centimeters.

7. The LIDAR sensor system of claim 1, further comprising a motor configured to rotate the multi-faceted deflector.

8. An autonomous vehicle control system, comprising:
    a laser source configured to output a first beam;
    an irregular polygon scanner configured to receive the first beam and output the first beam as a second beam, wherein the irregular polygon scanner comprises a multi-faceted deflector having a cross-section with an irregular polygonal shape; and
    one or more processors configured to:
        determine at least one of a range to an object or a velocity of the object based on a return signal from reflection of the second beam by the object; and
        control operation of at least one of a steering system or a braking system of an autonomous vehicle based on the at least one of the range or the velocity.

9. The autonomous vehicle control system of claim 8, wherein the multi-faceted deflector comprises a plurality of facets that are each reflective.

10. The autonomous vehicle control system of claim 8, wherein the multi-faceted deflector comprises a plurality of facets that each have a diffraction grating.

11. The autonomous vehicle control system of claim 8, wherein the multi-faceted deflector is a first first multi-faceted deflector configured to rotate about a rotation axis, and wherein the autonomous vehicle control system comprises a second deflector configured to rotate about the rotation axis.

12. The autonomous vehicle control system of claim 8, further comprising a modulator configured to apply at least one of frequency modulation or phase modulation to the first beam.

13. The autonomous vehicle control system of claim 8, wherein a diameter of the multi-faceted deflector is greater than or equal to about 0.5 centimeters and less than or equal to about 10 centimeters.

14. The autonomous vehicle control system of claim 8, further comprising a motor configured to rotate the multi-faceted deflector.

15. An autonomous vehicle, comprising:
a laser source configured to output a first beam;
an irregular polygon scanner configured to receive the first beam and output the first beam as a second beam, wherein the irregular polygon scanner comprises a multi-faceted deflector having a cross-section with an irregular polygonal shape;
a steering system;
a braking system; and a vehicle controller comprising one or more processors configured to:
determine at least one of a range to an object or a velocity of the object based on a return signal from reflection of the second beam by the object; and
control operation of at least one of the steering system or the braking system based on the at least one of the range or the velocity.

16. The autonomous vehicle of claim 15, wherein the multi-faceted deflector comprises a plurality of facets that are each reflective.

17. The autonomous vehicle of claim 15, wherein the multi-faceted deflector comprises a plurality of facets that each have a diffraction grating.

18. The autonomous vehicle of claim 15, further comprising a modulator configured to apply at least one of frequency modulation or phase modulation to the first beam.

19. The autonomous vehicle of claim 15, wherein a diameter of the multi-faceted deflector is greater than or equal to about 0.5 centimeters and less than or equal to about 10 centimeters.

20. The autonomous vehicle of claim 15, further comprising a motor configured to rotate the multi-faceted deflector.

\* \* \* \* \*